United States Patent [19]
Duault et al.

[11] Patent Number: 5,600,641
[45] Date of Patent: Feb. 4, 1997

[54] VOICE CIRCUIT EMULATION SYSTEM IN A PACKET SWITCHING NETWORK

[75] Inventors: Maurice Duault, Saint Laurent du Var; Gerard Lebizay, Vence; Claude Galand, Cagnes sur Mer, all of France

[73] Assignee: International Business Machines Corporation, Armonk, N.Y.

[21] Appl. No.: 451,580

[22] Filed: May 26, 1995

[30] Foreign Application Priority Data

Jul. 7, 1994 [EP] European Pat. Off. ............ 94480062

[51] Int. Cl.$^6$ ................................................ H04L 12/56
[52] U.S. Cl. ............................................ 370/400; 370/410
[58] Field of Search ........................ 370/60, 60.1, 68.1, 370/84, 85.7, 94.3, 66, 68

[56] References Cited

U.S. PATENT DOCUMENTS

| | | | |
|---|---|---|---|
| 5,199,027 | 3/1993 | Barri | 370/60 |
| 5,276,677 | 1/1994 | Ramamurthy et al. | 370/60 |
| 5,357,508 | 10/1994 | Boudec et al. | 370/68.1 |
| 5,379,277 | 1/1995 | Yamashita et al. | 370/68.1 |

FOREIGN PATENT DOCUMENTS 0354120  2/1990  European Pat. Off. .
0528086  2/1993  European Pat. Off. .

OTHER PUBLICATIONS

Int. Switching Symposium, vol. V May 27, 1990, pp. 1–8.
IEICE Trans. on Communications., vol. E76–B No. 7, Jul. 1993 pp. 719–722.

*Primary Examiner*—Benedict V. Safourek
*Attorney, Agent, or Firm*—Joscelyn G. Cockburn

[57] ABSTRACT

Voice circuit emulation system in a packet switching network includes a plurality of switching nodes (SW-1, SW-2, . . . ) interconnected by connection lines (TL-1, TL-2, . . . ), enabling voice signals to be transmitted in circuit emulation packets from any source exchange telephone device (PBX-A) to any destination exchange telephone device (PBX-B). Each switching node (SW-1 or SW-2) includes a circuit emulation server (CES-1 or CES-2) including a plurality of connection tables corresponding each to an incoming connection line, each table containing for each incoming connection line, the identification of each outgoing connection line associated to each slot of the circuit emulation packet received from the incoming connection line and the identification of each slot of the packet to be transmitted on the outgoing connection line. A switching module looks up the connection table for each slot contained in each incoming circuit emulation packet received from all incoming lines and thereby transferring the contents thereof to the slot of the outgoing connection line identified in said connection table.

22 Claims, 13 Drawing Sheets

CONNECTION TABLES

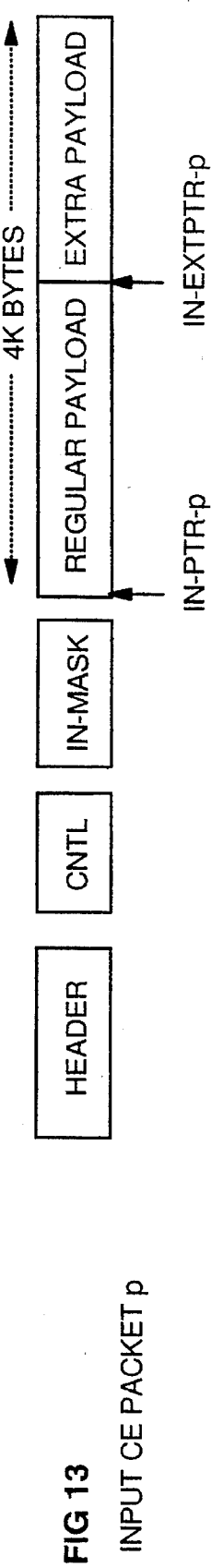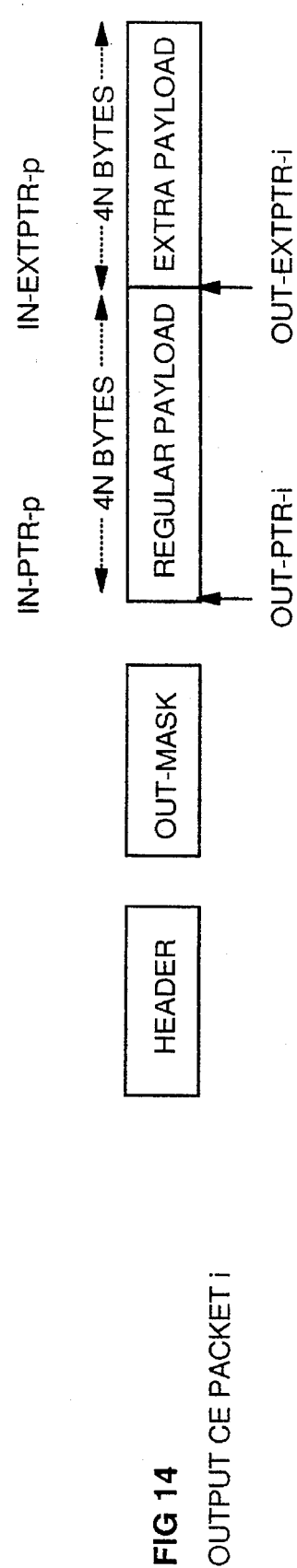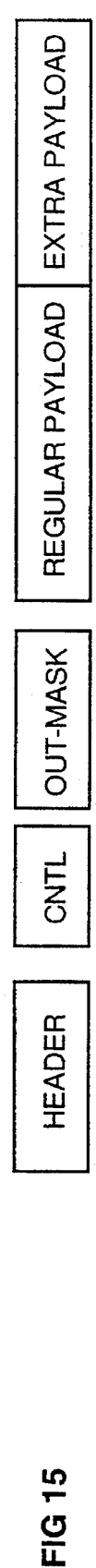
FIG 8
FIG 13
INPUT CE PACKET p
FIG 14
OUTPUT CE PACKET i
FIG 15
OUTPUT CE PACKET
AFTER
POST-PROCESSING

VOICE CIRCUIT EMULATION SYSTEM IN A PACKET SWITCHING NETWORK

FIELD OF THE INVENTION

The present invention relates to the emulation of circuit switching, and relates particularly to a system and a process for emulating voice circuits in a packet switching network.

BACKGROUND ART

The telecommunication environment is in full evolution and has changed considerably this recent years. The principal reason has been the spectacular progress realized in the communication technology due to the maturing of fiber optical transmission (high speed rates can now be sustained with very low bit error rates) and the universal use of digital technologies within private and public telecommunications networks.

In relation with these new emerging technologies, the offer of the telecommunication companies, public or private, are evolving. Indeed, the emergence of high speed transmissions entails an explosion in the high bandwidth connectivity; the increase of the communication capacity generates more attractive tariffs; a higher flexibility is offered to the users to manage their growth through a wide range of connectivity options, an efficient bandwidth management and the support of new media; and once sampled and digitally encoded, voice, video and image derived data can be merged with pure data for a common and transparent transport.

In a first step, networks were primarily deployed with TDM (Time Division Multiplexing) technology to achieve cost savings through line aggregation. These systems easily supported the fixed bandwidth requirements of host/terminal computing and 64 Kbps PCM (Pulse Code Modulation) voice traffic.

The data transmission is now evolving with a specific focus on applications and by integrating a fundamental shift in the customer traffic profile. Driven by the growth of workstations, the local area networks (LAN) interconnection, the distributed processing between workstations and super computers, the new applications and the integration of various and often conflicting structures hierarchical versus peer to peer, wide (WAN) versus local (LAN) area networks, voice versus data—the data profile has become higher in bandwidth, bursting, non deterministic and requires more connectivity. Based on the above, it is clear that there is strong requirement to support distributed computing applications across high speed backbones that may be carrying LAN traffic, voice, video, and traffic among channel attached hosts, business workstations, engineering workstations, terminals, and small to intermediate file servers. This traffic reflects a heterogeneous mix of: end user network protocols, and real time (steady stream traffic such as voice and video) and non real time (bursty nature traffic such as interactive data) transmissions.

The vision of a high-speed protocol-agile backbone network is the driver for the emergence of fast packet switching network architecture in which data, voice, and video information are digitally encoded, chopped into small packets and transmitted through a common set of nodes and links.

The basic advantage of packet switching techniques compared to circuit switching techniques, is to allow a statistical multiplexing of different types of data over a line (data, voice, image, video), which optimizes the bandwidth. The drawback of packet switching techniques compared to circuit switching techniques, is that it typically introduces jitter and delay.

One can reduce the jitter by reducing the packet size. For example, ATM (Asynchronus Transport Mode) standard defines 53 byte packets, called cells, which include a 5 byte header and a 48 byte payload. Due to this small granularity, the jitter across the network is bounded to a small value, and can therefore be compensated at the receiving end by a play-out buffer. This buffer is engineered so as to introduce a delay at least equal to the maximum jitter in the network. The cells are enqueued in this buffer and are served first in-first out after being delayed by the buffer, which insures that any cell that will be delayed by the maximum jitter in the network can be served right in time after the previous cell which is still retained in the play-out buffer when the delayed cell arrives at the receiving end.

As far as the delay issue, packet switching techniques require to receive every byte of a payload before sending the packet. The associated delay is called the packetization delay, or cell payload assembly delay. For example, the time to file an ATM cell with Pulse Coded Modulation (PCM) voice coded at 64 kbps, is 5.875 ms. The total end-to-end cell latency, obtained by adding to this packetization delay the time to transport the cell over the network and to switch it across the different switching nodes on the route, is so large that it requires the use of costly echo cancelers. A method to avoid the use of echo cancelers is to reduce this delay either by partially filling cells or by sending even smaller packets. In both cases, the expense is an increased overhead and therefore a non optimal use of the bandwidth in the network.

For sake of example, the following is a short description of a packet switching system of the type which can be used to implement the invention.

FIG. 1 of the drawings represents a packet switching network including 7 switching nodes SW-1 to SW-7 interconnected by trunk lines TL's, and that can be accessed by access lines AL's connected to outside data terminal equipments DTE's.

The network control architecture is a distributed one, which means that each switching node is controlled by a control point CP. All CP's are interconnected via a control point spanning tree which provides an efficient means for multicasting control messages between the control points. When a CP wants to broadcast a message to other CP's in the network, it sends this message to the switching address of the predefined spanning tree, and the architecture provides the means to route this message on every line of the CP spanning tree, and only on these lines. The architecture also provides the means to initialize the tree address on each switching node, and to automatically re-configure the tree in case of line or switching node failure.

Each CP includes a copy of the Topology data base that contains information about the network. It includes the network physical configuration and the line characteristics and status. For every line n, in the network, the maximum delay T(n) that can be introduced on a packet with a specified priority, and the level of bandwidth reservation R-res(n) of this line are recorded in the Topology Data Base. This information is distributed to other control points via topology update messages sent over the control point spanning tree whenever it presents significant changes.

User equipments DTE-A and DTE-B are respectively connected to the network via access lines AL-A and AL-B. These equipments are to be interconnected thru the network with a given quality of service (QoS) specified in terms of a maximum delay T_max and a packet loss probability P_loss.

At the switching node SW-1, the control point CP-1 first uses the QoS and the traffic characteristics specified by the user (peak rate, mean rate, average packet length) to compute the amount of bandwidth C_eq, called the equivalent capacity of the connection, to be reserved on every line on the route in order to guarantee a packet loss probability P_l(n) on this line is much smaller than the loss probability P_loss that has been specified for the connection.

Based on the information that is available on a line basis in the Topology Data Base, the control point CP-1 then computes the best route in the network to reach the destination. The Path Selection program first identifies the lines that are eligible for the route. If R(n) and R_res(n) respectively denote the capacity of line n and its current level of reservation, then the line is eligible if:

$$R\_res(n)+C\_eq \leq 0.85\ R(n)$$

it then uses a modified Bellman-Ford algorithm to find the minimum weight, minimum hop count, route from the origin to the destination which uses eligible lines and which satisfies the QoS.

$$T\_max\ \Sigma T(n)$$

$$P\_loss \leq 1-\Pi(1-P\_l(n))$$

where the summation and product operators are carried over the N lines of the route (n=1, ..., N).

Let's assume that the chosen route from switches SW-1 to SW-3 uses trunk lines TL-1 and TL-2 via switch SW-2.

FIG. 2 shows the message flows between the CP's on the route when a new connection is established. The origin control point CP-1 sends a connection set-up message along the route, a copy of which is delivered to the control point of every switch on the route. This message contains a list of the network addresses of the control points on the route, the list of the line names between these control points, the request bandwidth C_eq, the priority of the connection, and a connection correlator C_cor which is set by the origin CP-1, and which is used by all other CP's to uniquely identify the connection.

Upon reception of the copy of the set-up message, each CP performs two basic tasks.

First, the CP checks whether the equivalent capacity of the new connection is still available on the line to the next switching node on the route, and if it is available, it reserves it. Therefore, the CP checks whether the line is eligible by verifying the first above relation. If it is, the CP reserves the desired amount of bandwidth on the transmit line for the new connection, accepts the connection set-up, increments the reservation level:

$$R\_res(n)=R\_res(n)+C\_eq$$

and if this reservation level has significantly changed, it eventually broadcasts a topology update message on the CP spanning tree to inform the other CP's of the new reservation level R_res of this particular line.

Second, the CP allocates a new label for the new connection, and sends back this label to the control point of the previous switch on the route, for label swapping purpose. Bandwidth reservations and label allocations are acknowledged from all the CPs on the route, that is CP-2 and CP-3 (see FIG. 2). At the input switch adapter, the data packets that are received from the user equipment DTE-A are appended with a network header which contains the label L2, and with a switch routing header that will be used locally by switch SW-1 to route the packet to the desired transmit adapter for transmission over the line TL-1. At the next switch SW-2, the label L2 of each packet is used to look-up a table which returns the label L3 and a switch routing header. The packet label L2 is swapped for the new label L3, and the packet is forwarded to the appropriate transmit adapter according to the switch routing header for transmission on line TL-2.

At a transmit adapter, the packet is enqueued in one of three possible queues, according to its priority. Three possible traffic priorities are defined, real-time RT, non-real-time (NRT), and non-reserved (NR, or best effort). Typically, the highest priority class RT is used to transport voice or video, the second class NRT is used to transport interactive data, and the third class NR is used for file transfer. Upon request, a scheduler serves the real-time queue with the highest priority and the non-reserved queue with the lowest priority. That means that at every request for a new packet, the scheduler first looks at the real-time queue and serves a real-time packet. If this queue is empty, then the scheduler looks at the non-real-time queue and eventually serves a non-real-time packet. The non-reserved queue is served only when both real-time and non-real-time queues are empty.

The routing operation is repeated until the packet reaches the transmit port adapter of switching node SW-3 where the network header is discarded and the packet is sent to the user equipment DTE-B.

The above network architecture allows to transport packets across the network while ensuring a pre-specified quality of service. However, if the packets carry voice signals, the smallest delay which can be achieved by the network will be specified and automatically met by the choice of the proper route. But the packetization delay of the digitized voice yet may be such that the voice connection still requires costly echo cancelers. Reducing the packetization size would of course reduce the packetization delay, but would also increase the relative packet overhead and therefore waste bandwidth on the network lines.

SUMMARY OF THE INVENTION

The main object of the invention is therefore to provide a system for transmitting voice signals in a packet switching network while optimizing simultaneously the bandwidth and the end-to-end latency.

Another object of the invention is to provide a system for emulating voice circuits on a packet switching network while minimizing the end-to-end delay of transmission, thereby avoiding the use of echo cancelers.

Accordingly, the invention relates to a voice circuit emulation system in a packet switching network comprising a plurality of switching nodes interconnected by connection lines and including intermediary switching nodes connected only to other intermediary switching nodes and end switching nodes each connected to at least an exchange telephone device, each switching node being associated to a control point in charge of controlling the exchange of voice signals carried out by switching packets in the network between two exchange telephone devices. Such voice circuit emulation system comprises computing means contained in the control points associated to the switching nodes for determining the best route between any source exchange telephone device and any destination exchange telephone device by identifying which of the connection lines are eligible based upon the requirement of a quality of service specified in terms of a maximum delay and a packet loss probability, setting up means in the control point associated to the first switching node of any such determined best route for transmitting a set-up message to the control points associated to all the switching nodes along the best route so as to reserve an amount of bandwidth on each connection line of the best route outgoing from each of the switching nodes along the best route. Each switching node comprises a circuit emulation server including a connection table containing, for each incoming connection line, the identification of each outgoing connection line associated to each slot of the circuit emulation packet received from the incoming connection line and the identification of each slot of the packet to be transmitted on the outgoing connection line, a switching module for looking up the connection table for each slot contained in each incoming circuit emulation packet received from all incoming lines and thereby transferring the contents of the received slot to the slot of the outgoing connection line identified in the connection table.

The invention relates also to a process for establishing a circuit switching connection in a packet switching network provided with a voice circuit emulation system as decribed above, comprising the steps of determining the best route to transmit voice signals between any source exchange telephone device and any destination exchange telephone device, setting up each switching node of the best route for receiving and transmitting packets containing a slot of voice signals from a source exchange telephone device to a destination exchange telephone device. Such a setting up step comprises the following steps:

—the control point associated to each switching node of the best route sends a set-up-slot message to its associated circuit emulation server identifying the input connection line, the output connection line, the circuit emulation server associated to the preceding switching node of the connection and the circuit emulation server associated to the next switching node of the connection, and —the associated circuit emulation server reserves a slot on the input connection line and sends an activate slot message to the preceding circuit emulation server of the connection containing the identification of the input connection line and the identification of the reserved slot on the input connection line.

BRIEF DESCRIPTION OF THE DRAWINGS

The above set forth and other objects and features of the invention will be made more apparent in the following detailed description of the best embodiment when read in conjunction with the attached drawings wherein:

FIG. 9 is a block-diagram of the packet scheduling in the receive and transmit adapters associated to each circuit emulation server, FIG. 13 is a schematic representation of the format of an input circuit emulation packet, FIG. 14 is a schematic representation of the format of an output circuit emulation packet before post-processing, FIG. 15 is a schematic representation of the format of an output circuit emulation packet after post-processing.

DETAILED DESCRIPTION OF THE INVENTION

Figure 1:
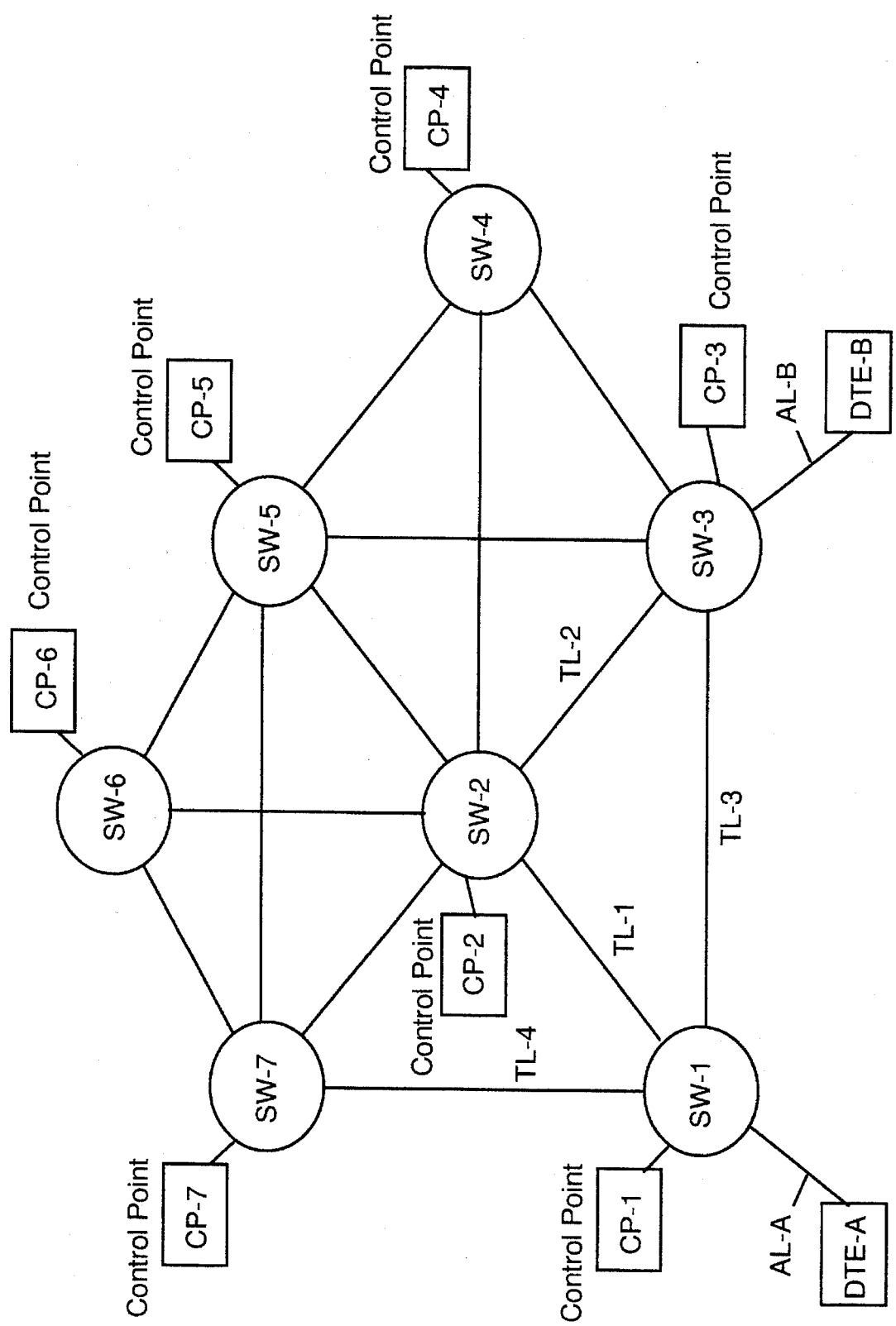
FIG. 1 is a schematic representation of a conventional packet switching network.
Figure 2:
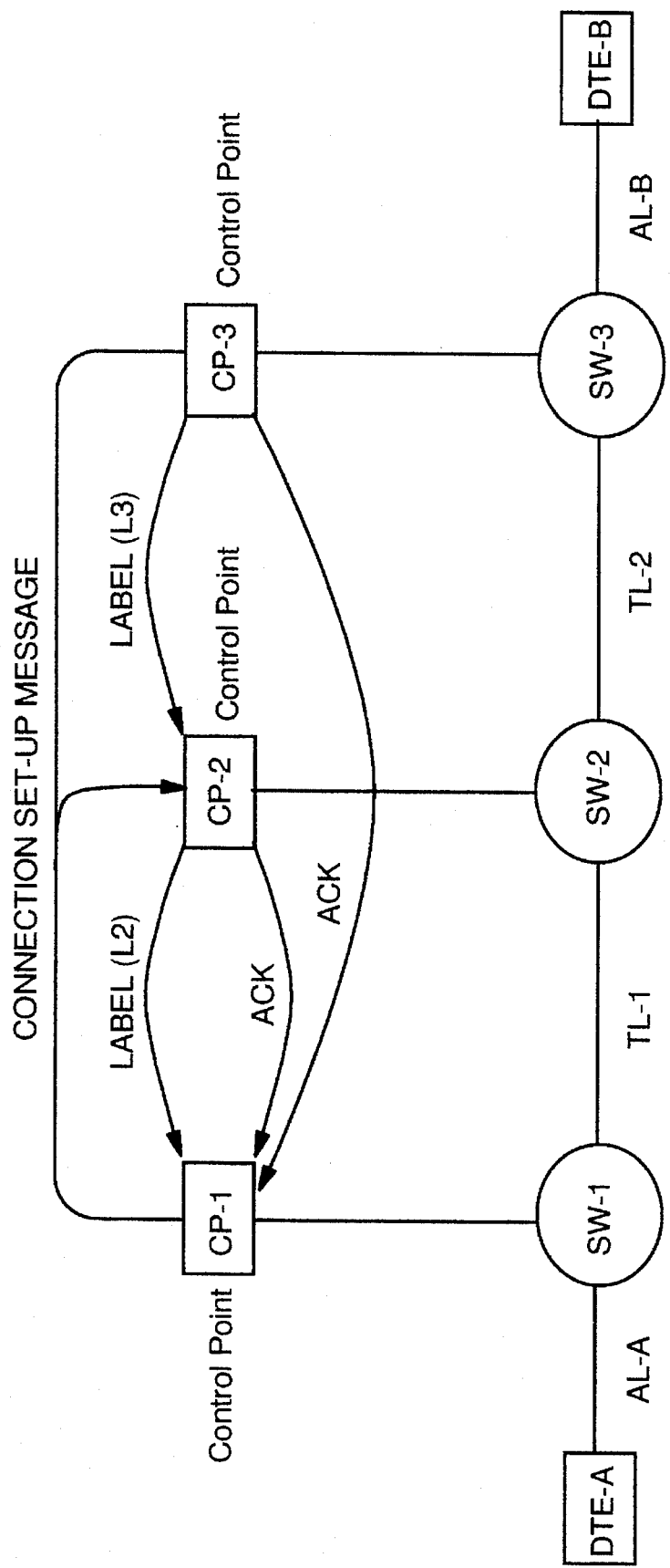
FIG. 2 shows the connection set-up flows in a packet switching network represented on FIG. 1.

FIG. 1 and FIG. 2 relating to a conventional packet switching network have been described as background of the present description and will not be described again.

Figure 3:
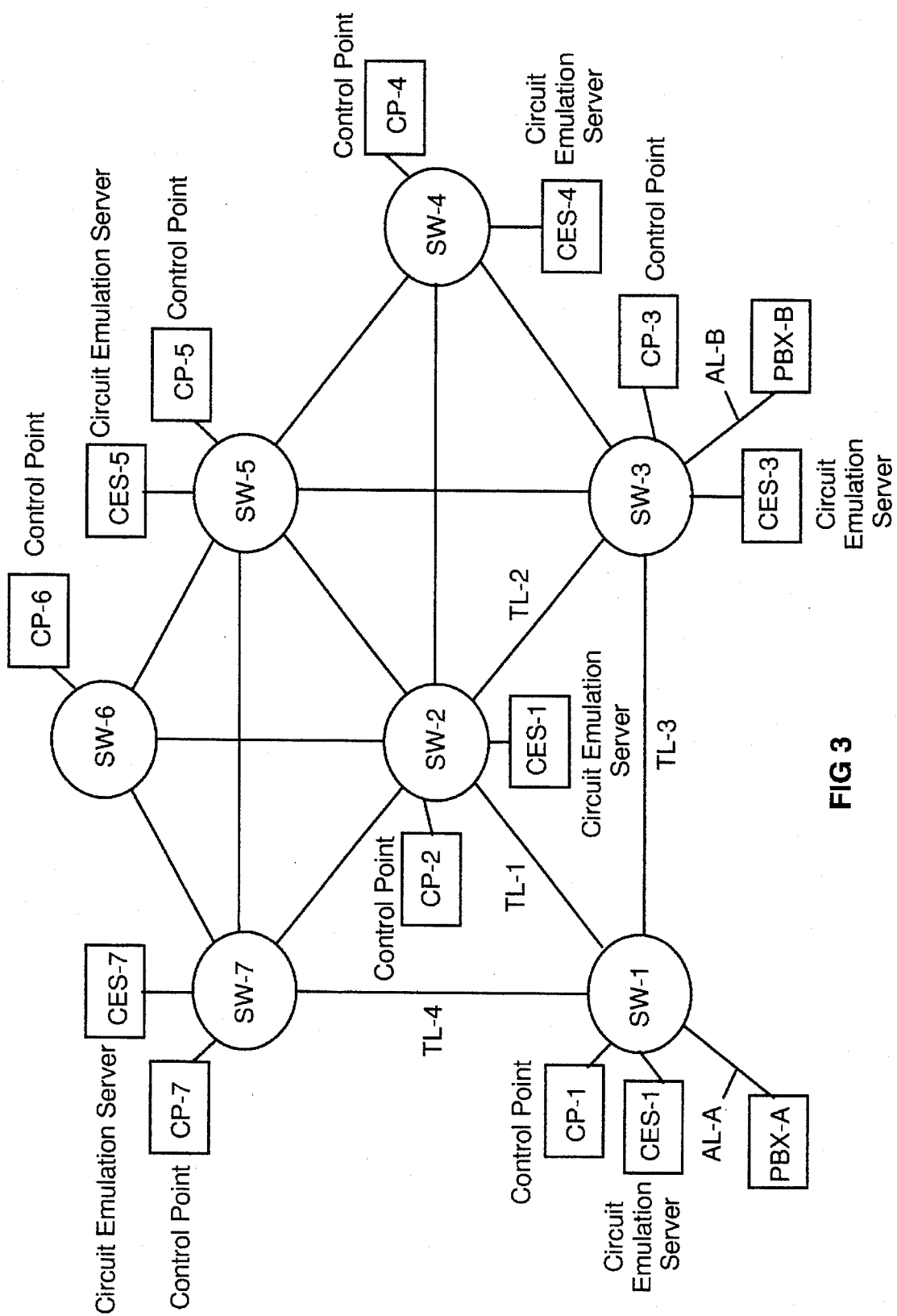
FIG. 3 is a schematic representation of a packet switching network including the circuit emulation facility according to the invention on some switching nodes.

FIG. 3 represents a packet switching network of the type briefly described in connection with FIG. 1 and FIG. 2. But, some of the switching nodes in the network are enabled for circuit emulation (nodes SW-1, SW-2, SW-3, SW-4, SW-5 and SW-7), by the incorporation at each node of a circuit emulation server CES which is one of the essential features of the invention.

Each circuit emulation server is in charge of the establishment of the circuit emulation connections across the switching node, and of the actual switching operation of the voice slots from input lines to output lines. The presence of a circuit emulation server on a particular switching node is reported in the Topology Data Base of the network and can therefore be used at path selection time to select a route that passes through switching nodes enabled for circuit emulation.

Private or Public Branch exchange telephone systems PBX-A and PBX-B are connected to the network via access lines AL-A and AL-B and can be interconnected using the emulated voice circuit switching over the packet switching network.

Figure 4:
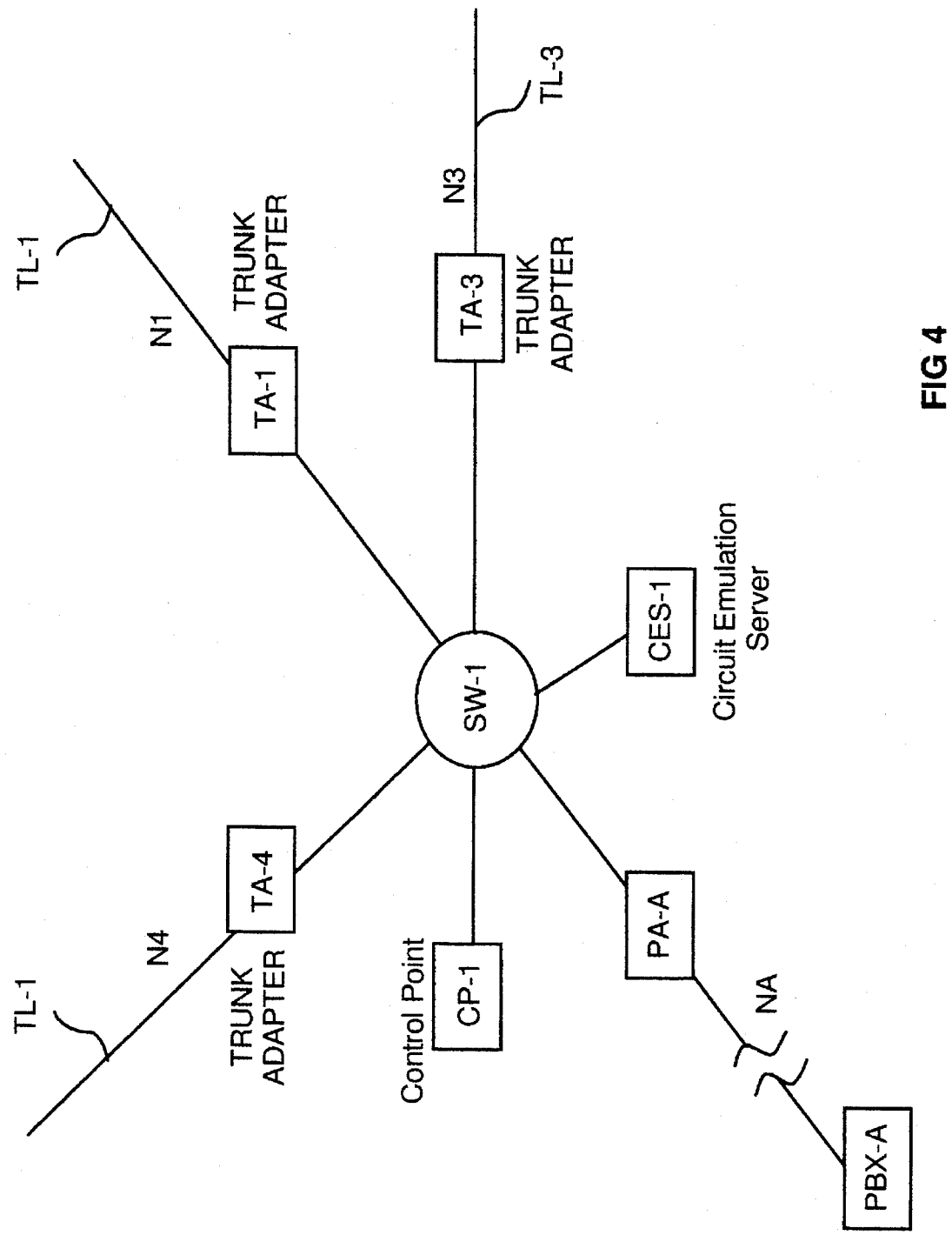
FIG. 4 represents the essential features associated to a switching node having the circuit emulation facility according to the invention.

FIG. 4 shows the switching node SW-1 with its associated units and lines connecting it to the data terminal equipment, here PBX-A, and the other switching nodes. This figure is used to give an overview of the operation of the voice circuit emulation system according to the invention.

The access line AL-A is connected on one side to switch SW-1 through the switch port adapter PA-A, and on the other side to equipment PBX-A, which handles NA telephone circuits. For example, if AL-A is a E1 line (Europe), then NA=32, if AL-A is a T1 line (USA) then NA=24. At a given time, only a number Na of the NA telephone circuits are active (Na is less or equal to NA). The port adapter PA-A receives from PBX-A, NA bytes within each 125 microsecond period, and multiplexes the NA connections by building one packet every 0.5 millisecond. This packet therefore includes a network header and a 4NA-byte payload. It then sends this packet to the CE server (CES) through the switch. In the following, we will call such a packet a circuit emulation (or CE) packet, by opposition to a data packet.

Similarly, port adapter PA-A receives from the CE server a CE packet every 0.5 millisecond. This packet contains a fixed 4NA-byte payload, representing NA connections, of which Na are active.

The trunk lines TL-1, TL-3, and TL-4 are connected to SW-1 respectively through switch trunk adapters TA-1, TA-3, and TA-4. On the trunk lines, CE packets are distinguished from data packets thanks to a particular choice of their label by the control points. In the following, we will note by L0 the label which is assigned to a CE packet on a trunk line.

Whenever a switch trunk adapter receives a packet labelled L0, it swaps the label to a label L0-m which indicates both the receive adapter address m and the CE nature of the packet, then appends to this packet the appropriate switch routing header, and finally forwards the packet to the switch which in turn will forward it to the circuit emulation server CES.

On each of the trunk lines, in addition to normal data connections, one (or more) circuit emulation connections flow.

Each circuit emulation connection carries up to 32 voice slots. This granularity is convenient since all the voice slots in a T1 or an E1 which are the granularities used for inter PBX connection in public and private telephone networks, can be carried on a single circuit emulation connection.

Let's denote by Na, N1, N3, and N4 the number of voice slots activated respectively in the circuit emulation connections on lines AL-A, TL-1, TL-3, and TL-4. Each CE packet arriving at SW-1 from trunk line TL-1 includes a 4N1 byte payload, each CE packet arriving at SW-1 from access line AL-A includes a 4NA byte payload, but only 4Na of these bytes correspond to the a activated voice connections.

At switch SW-1, the four CE packets arriving from lines AL-A, TL-1, TL-3, and TL-4 within a 0.5 millisecond period are sent to the CE server CES-1, which builds four packets which are sent back to the four lines for transmission purpose.

Means including a specific packet format, switching mechanisms that are implemented in the circuit emulation server, and a set of protocols for circuit set-up and take-down, enable the CE packets to be transmitted over the packet switching network concurrently with data packets. They are described in the following.

SETTING UP A CONNECTION

The establishment of a new voice connection in the network uses the basic mechanisms that are used to establish a data connection, as described in the state of the art technique, but requires additional control mechanisms that involve interactions between the network control points CP and the control modules of the circuit emulation servers CES. These mechanisms are based on control messages that are exchanged either between two CP's, or between a CP and a CES, or between two CES's. In order to be able to dynamically add or remove a slot from a CE connection, two CES can communicate by using either normal out-of-band control messages, or in-band control messages which are carried in the optional control field of the CE packets.

In the following, it is assumed that, at the time the new slot is established between the exchange telephone system PBX-A and PBX-B, one circuit emulation connection is already set on each of the trunk lines TL-1 and TL-2. It should be clear however that this assumption is used for simplification of the description, since additional control can easily be provided in order to set additional circuit emulation connections on a trunk line whenever none is available on a trunk, or to set additional circuit emulation connections when necessary.

Figure 5:
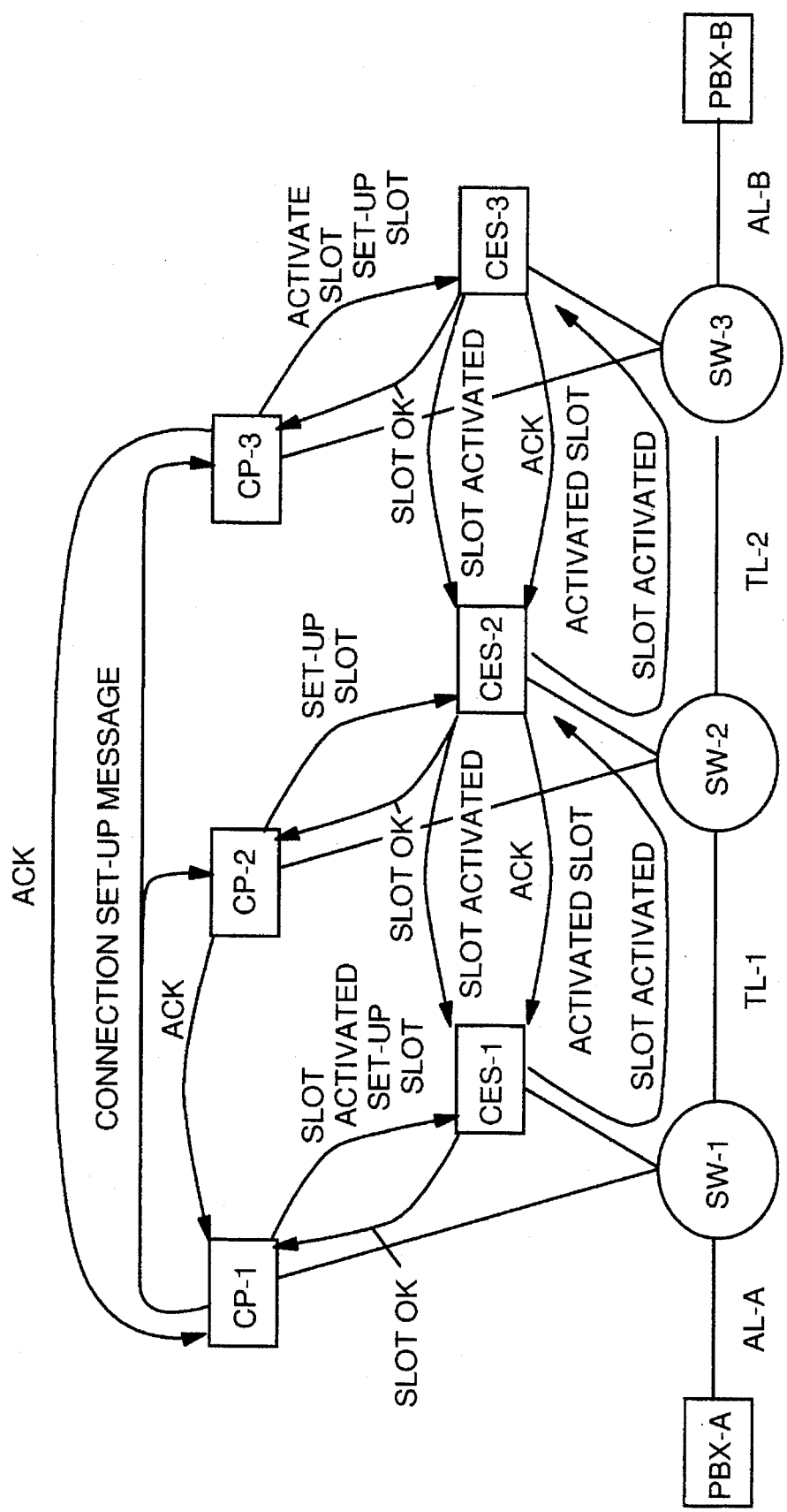
FIG. 5 shows the connection set-up flows in the packet switching network represented on FIG. 3.

FIG. 5 shows the messages that flow between the CP's and CE servers located on the route when a new voice connection is established between PBX-A and PBX-B through switches SW-1, SW-2 and SW-3 and therefore including three control points CP-1, CP-2, CP-3 and the circuit emulation servers CES-1, CES-2 and CES-3.

The first task of the origin control point CP-1 is to compute the best route in the network to reach the destination. As in the case of the establishment of a data connection, the path selection algorithm uses the information that is available in the Topology Data Base to compute the route that matches the QoS specified by the user, that is a maximum packet lost probability P_loss and a maximum end-to-end delay T_max. In addition, it is specified that the connection is a CE connection with a peak bandwidth of 64 kbps (1 slot bandwidth is C_eq=64 kbps).

Before going further, it must be noted that a maximum jitter J(n), reported in the Topology database, which can be introduced by a transmit adapter or a circuit emulation packet is a characteristic of every line in the network. It is also desirable to limit the maximum number of circuit emulation connections on a particular line in order to ensure that a portion of this line is always available to data traffic. For that, further to J(n), the Topology database also reports the maximum number of voice slots Q_max(n) that a transmit adapter can handle at a time and the current number Q(n) of slots that it actually handles.

The Path Selection program first identifies the lines that are eligible for the route. If R(n) and R_res(n) respectively denote the line capacity and its current level of reservation, then a line is eligible if it is connected to two switching nodes that are enabled for circuit emulation, (i.e. that support a CE server), and if:

$$R\_res(n)+C\_eq \leq 0.85.R(n) \qquad (1)$$

$$Q(n)+1 \leq Q\_max(n) \qquad (2)$$

It then uses a modified Bellman-Ford algorithm to find the minimum weight, minimum hop count, route from the origin to the destination which uses eligible lines and which satisfies the QoS.

$$T\_max \leq \Sigma T(n) \qquad (3)$$

where T(n) is the delay for line n $$P\_loss \leq 1-\Pi(1-P\_l(n)) \qquad (4)$$

where P_l(n) is the packet loss probability of line n $$\Sigma J(n) \leq 0.5 \text{ ms} \qquad (5)$$

where the summation and product operators are carried over the N lines of the route (n=1, . . . ,N).

It is now assumed that the chosen route from switching node SW-1 to switching node SW-3 uses trunk lines TL-1 and TL-2 via switching node SW-2.

The origin control point CP-1 sends a connection set-up message along the route, a copy of which is delivered to the control point of every switch on the route, that is CP-2 and CP-3. This message contains a list of the network addresses of the control points on the route, the list of the line names between these control points, the request bandwidth C-eq, the priority of the connection which is the higher priority since it is a circuit emulated connection, and a connection correlator C__cor which is set by the origin CP-1, and which is used by all other CP's to uniquely identify the connection.

Upon reception of the copy of the set-up message, each CP performs two basic tasks.

The first task the control point performs is to check whether the equivalent capacity required for the new connection is available on the line to the next switching node on the route. On top of the tests that are usually performed for the bandwidth reservation for a data connection, the CP checks whether the transmit adapter has provisioned enough buffering so as to handle the new slot. Using the same notations as for the set up of the route in the reported state of the art network, the CP checks whether:

$$R\_res(n)+C \leq 0.85.R(n) \quad (1)$$

and $$Q(n)+1 \leq Q\_max(n) \quad (2)$$

If both inequalities (1) and (2) are verified, then the CP reserves the desired amount of bandwidth on the transmit line for the new connection.

The second task the control point performs is to send a set-up slot message to the circuit emulation server located on its switching node. The CP then waits until it receives a slot OK message back from this CE server, which confirms that the slot has been reserved and that the server is now expecting the connection to start. Then, the CP increments the reservation levels of the line:

$$R\_res(n)=R\_res(n)+C\_eq$$

$$Q(n)=Q(n)+1$$

The CP then accepts the connection set-up, and eventually broadcasts a topology update message on the CP spanning tree to inform the other CP's of the new reservation levels R__res(n) and Q(n) of this particular line. Finally, it sends an acknowledge message back to the origin Control point CP-1 to inform it that the slot and bandwidth reservation have been reserved on the trunk. Once CP-1 has received the acknowledgement message from all CP's on the route, it starts the effective transmission of data for this connection.

The protocol between the CP's and the CE's servers are explained now in detail, always in reference to FIG. 5. But, at this point of the description it is necessary to look at the architecture of each CE server.

Figure 6:
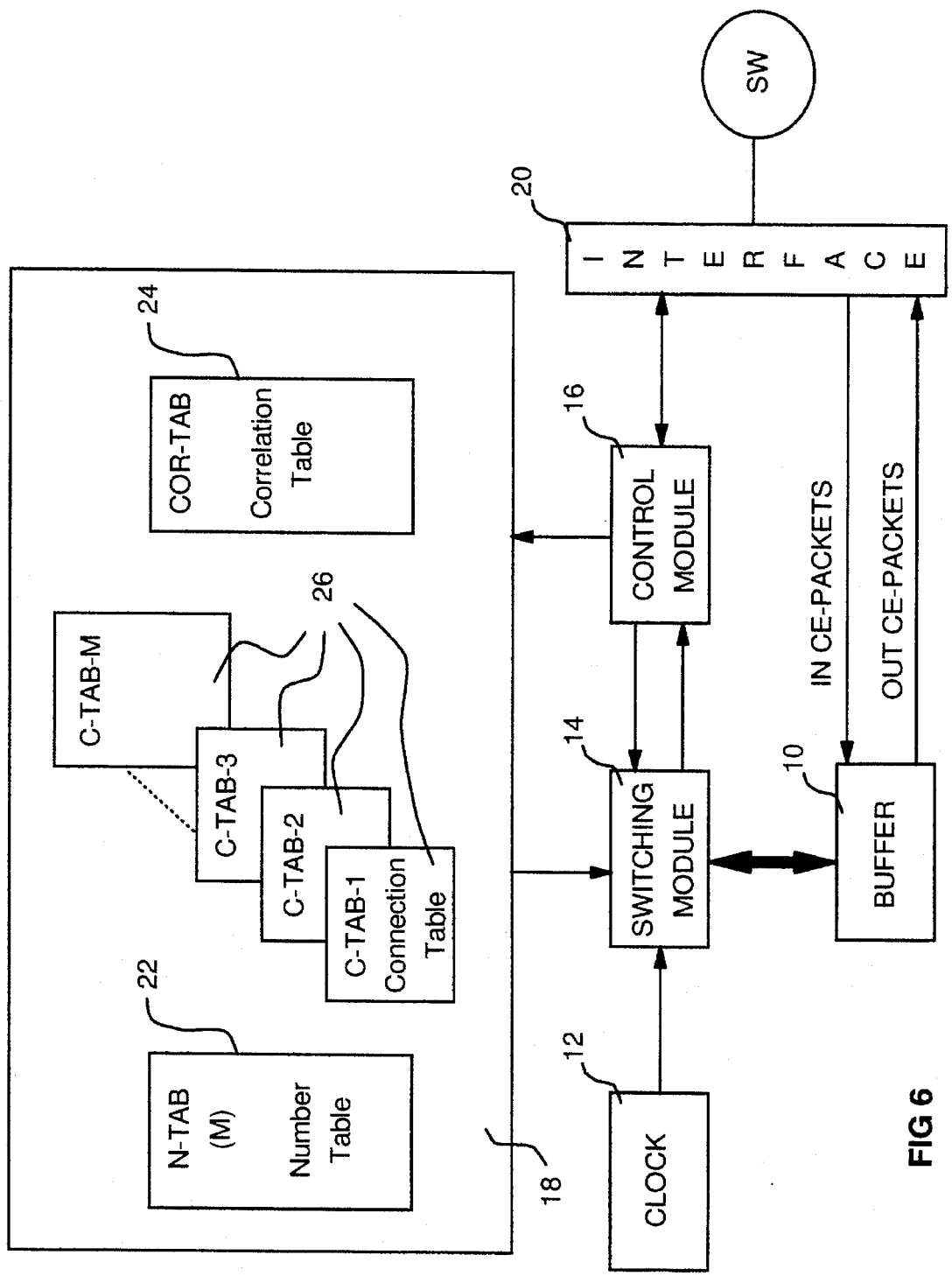
FIG. 6 is a schematic representation of the different parts included in a circuit emulation server according to the invention.

Referring to FIG. 6, each CE server includes a buffer memory 10, a reference 2 kHz clock 12, a switching module 14, a control module 16, a local store 18, and an interface 20 to the switching node SW that enables the CE server to receive packets from the switching node into buffer 10 (in CE-packets), and to transmit packets (out CE-packets) from buffer 10 to the switching node. Control module 16 can also receive or transmit network control messages from or to network addressed entities like control points or other CE-server, through the switch interface 20.

The switching process is enabled thanks to control information stored and maintained in local store 18 by the control module 16. This information includes one slot number table N-TAB 22 and one connection correlation table COR-TAB 24 per server, and one connection table C__TAB-m 26 per input adapter, where index m denotes the adapter index and ranges from 1 to M.

The slot number table N-TAB has M entries, one for each input adapter, and indicates for each adapter the number of slots currently activated on the corresponding input adapter.

N-TAB(m)=Number of slots in input CE packet from adapter m (m=1, . . . ,M)

For each adapter, the connection table C-TAB-m has N-TAB(m) entries, one for each connection established thru adapter m.

Each entry in the connection table has three fields to control the switching operation and to give the status of the connection.

C-TAB-m(n)=(i,j, status) for n=1, . . . ,N-TAB(m)
   i: Output adapter index
   j: Output slot index
   status: 0=idle, 1=reserved, 2=activated Switching module 14 interprets each entry of this table as follows. A connection with correlator C-cor on input adapter m is either idle, or reserved, or active. If status is idle, then slot n on input CE packet can be used for establishing new connections. If status is reserved, then slot n on input CE packet cannot be used for establishing new connections, and if status is activated, then slot n in every input CE packet coming from adapter m is to be forwarded to slot j on output adapter i.

The connection correlation table COR-TAB has as many entries as the number of voice slots switched by the server, and as already seen, is used during the establishment of a slot connection to retrieve useful index values from the connection correlator.

As already mentioned, upon reception of a connection set-up message, each intermediate control point sends a set-up-slot message to the CE server attached to its switching node, in order to set a new slot. In this set-up-slot message, the CP specifies the input line i, the output line j, the network address P-CES of the previous CE server on the route, the network address N-CES of the next CE server on the route, and the connection correlator C__cor. For example, the message sent by CP-2 to CE-2 would be:

Set-up-slot (i,j, CES-1, CES-3, C__cor)

where i corresponds to TL-1 and j corresponds to TL-2

Figure 7:
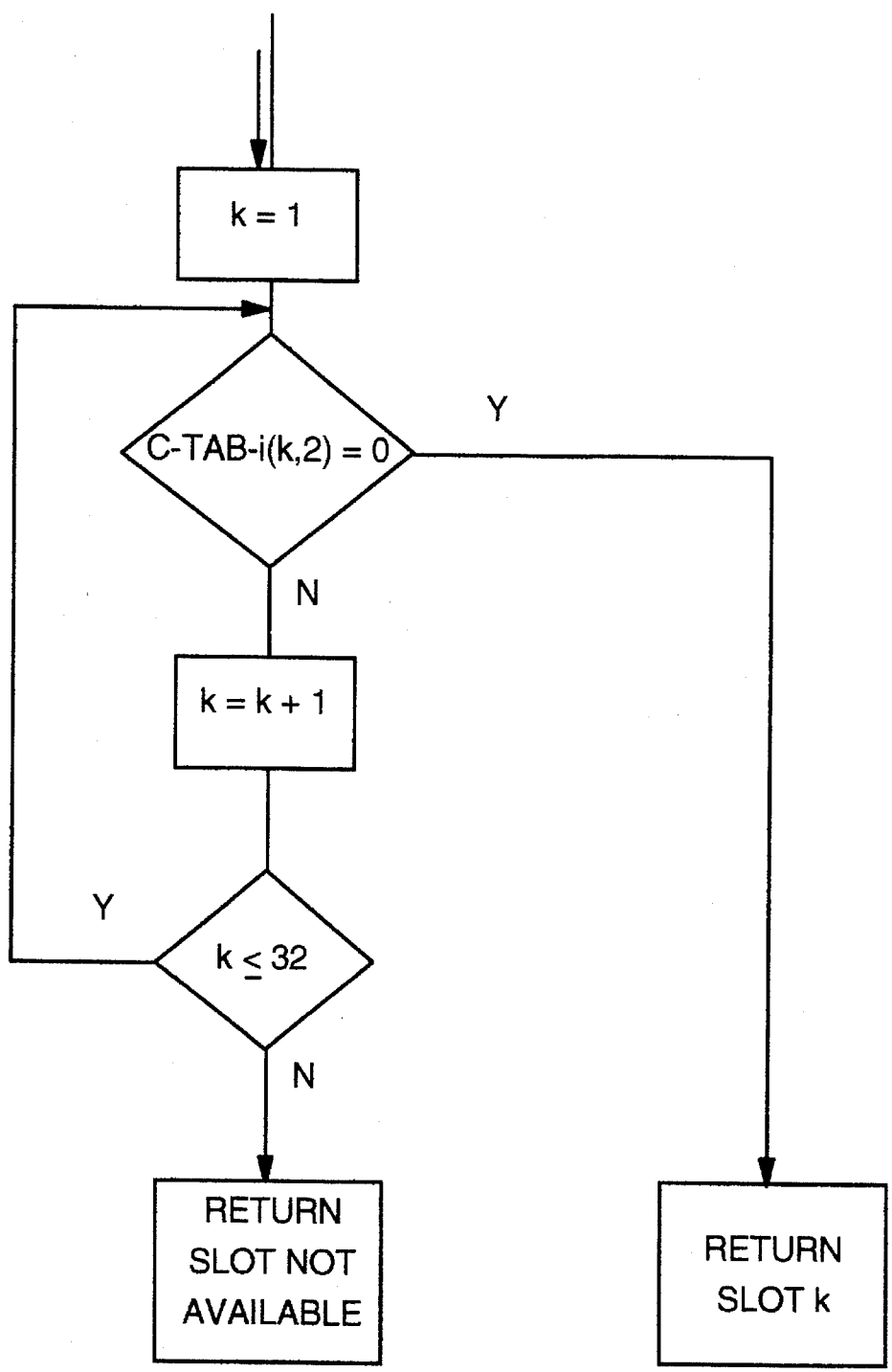
FIG. 7 is a flow-diagram of the slot selection algorithm used by the circuit emulation server.

When CES-2 receives the message from CP-2, it selects a slot k1 on input trunk i, using the slot selection algorithm shown on FIG. 7 where connection table C-TAB-i is searched for an available entry for the slot, wherein the status=0

C-TAB-i(k1)=X,X,0

It then reserves the corresponding entry in the connection table by setting the status flag to 1 and stores the output adapter index j:

C-TAB-i(k1)=j,X,1

In this relation, the X notation is used to mean that the status of slot k1 is not updated. The CE server also updates the correlation table COR-TAB with a new entry:

COR-TAB(C__cor)=i,k1

Actually, since the connection correlator usually takes quite a few bytes (e.g. 32 bytes), the table COR-TAB can be implemented by a standard content addressable memory (CAM), using either a hardware of a software technique.

CES-2 then sends an Activate-slot(i,k1,C_cor) control message to P-CES, that is CES-1, and no longer works on this connection set-up until it receives for this connection an Activate-slot message from N-CES, that is CES-3.

It must be recalled that CES-2 can send control messages to CES-1 thanks to the network address CES-1 it has learned from the control point upon receiving the set-up-slot message.

When CES-2 receives an Activate-slot(j,k2,C_cor) message from CES-3, it firsts looks up the correlation table with the connection correlator C_cor to get the input adapter index i and the slot number k1.

(i,k1)=COR-TAB-i(C_cor)

It then updates the corresponding entry of the connection table:

C-TAB-i(k1)=j,k2,1 and finally sends a slot-OK(i,j,C_cor) control message to its control point CP. This completes the initialisation phase for this server. CES-2 server then waits for an in-band message to actually start switching slots in the corresponding CE packets.

When CES-2 server receives on input adapter i an in-band Slot-activated(k1) message from CES-1, it first activates the corresponding entry in the connection table by setting the status flag to 2:

C-TAB-i(k1)=j,k2,2

The CE server then updates the proper entry of the control table N-TAB:

N-TAB(i)=N-TAB(i)+1

It then sends an out-of-band slot-activated-Ack(i,k1,C_cor) message to CES-1, and starts to switch slots in the corresponding CE packets. It also starts sending in-band slot-activated(k2) messages to CES-3, by inserting the adequate control byte in every CE packet forwarded on line j. When CES-2 receives an out-of-band slot-activated-Ack(j, k2,C_cor) message from CES-3 in response to these in-band control messages, it stops inserting the control messages in every CE packet forwarded on line j.

The above protocol is applicable to each intermediary switching node. But it is necessary to consider the end nodes used either as origin nodes (e.g. SW-1) or as destination nodes (e.g. SW-3), for which a specific protocol is applied as explained hereafter.

Based on the information included in the connection set-up message, the control point CP-3 knows that it is the destination control point for this connection. Indeed, this message states that the connection is to be set on slot b of line B, which line is recorded by CP-3 as a port line with NB voice circuits connected to PBX-B. As a result, CP-3 will indicate in its slot-set-up message to server CES-3 not only the line B, but also the slot b to be set up (with b less than, or equal to the number NB of telephone circuits handled by PBX-B through line AL-B). Also, CP-3 not only sends a set-up-slot message, but also an Activate-slot message to CES-3.

Similarly, CP-1 knows that it is the origin control point for the connection, and indicates in its set-up-slot message to CES-1 that slot a on access line A has to be activated.

When CP-1 has received the acknowledgement messages from all the CP's on the route, that is CP-2 and CP-3 in FIG. 5, it remains to activate the switching mechanisms that have been prepared all along the route of the connection. For that purpose, CP-1 sends a slot-activated(A(a)) control message to CES-1. Since CP-1 is the origin control point, this message is sent out-of-band. Upon receiving this message, CES-1 starts the actual switching of the slots indexed a in line A, and starts sending in-band slot-activated(k1) messages to CES-2, by inserting the adequate control byte in every CE packet forwarded on line i. Upon reception by CES-2, this message will trigger the activation of the next slot (slot k2 on line j), and the insertion of a control byte in every CE packet forwarded on line j to further activate the next slot (slot b on line AL-B) and thus starting the effective end-to-end data transmission between PBX-A and PBX-B.

CE PACKET TRANSMISSION

After the completion of the initialisation phase described above, the effective transmission of the CE packet is achieved as explained here below.

Figure 8:
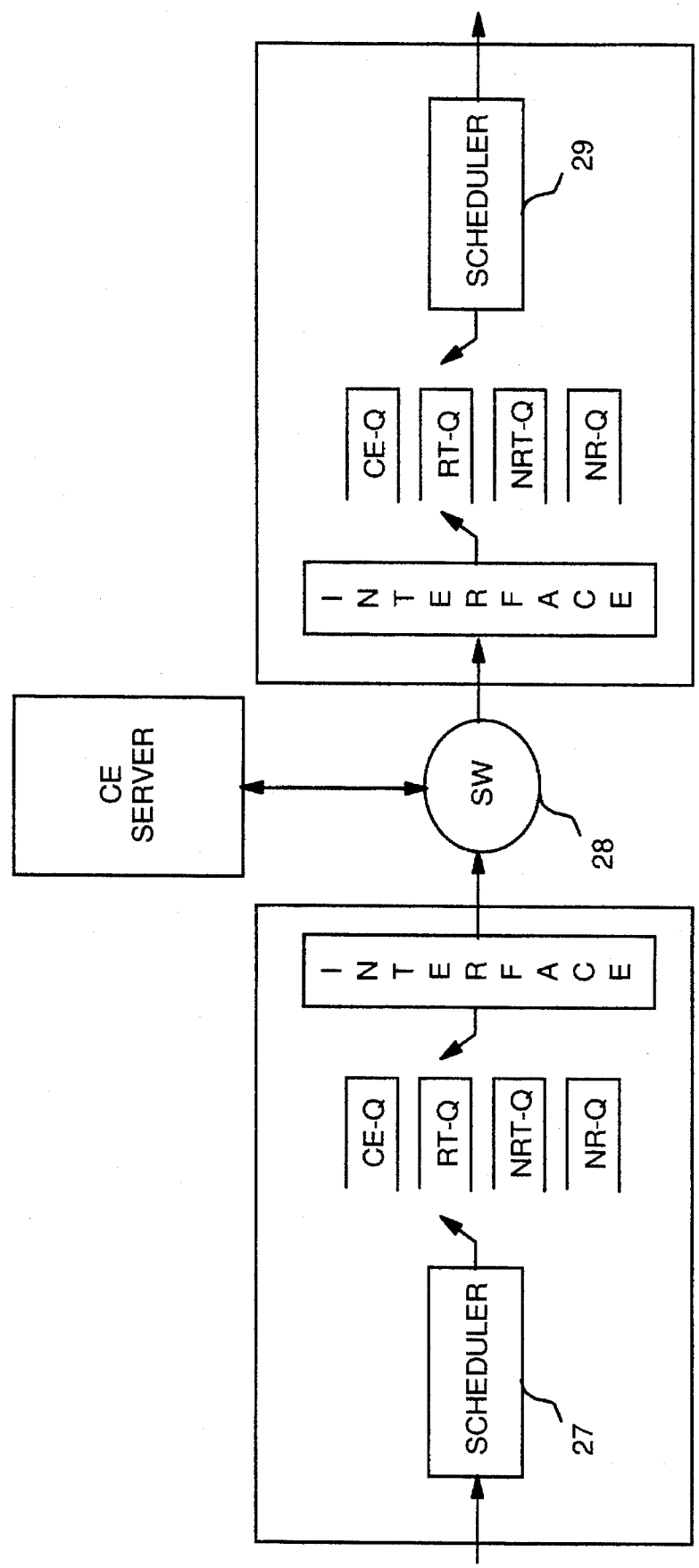
FIG. 8 is a schematic representation of the format of a circuit emulation packet.

FIG. 8 shows the format of a circuit emulation packet. It includes a header, an optional control field, a mask, and a payload.

The header includes a label LO, a 1-bit control flag (CF) and may include other information that is not essential for the invention and will not be discussed here. A header error correction field (HEC) protects all the information of the header.

The optional control field (CNTL) is included in the packet whenever the control flag CF is set in the header. This field carries in-band messages from a circuit emulation server to the next server on the route to signal that the format of this CE packet has just been modified, according to a pending request that the next server had made through an out-of-band control message, and that a control action must be taken before demultiplexing the slots carried by this packet.

Two in-band messages are defined: Slot-activated(k), to signal that a new slot has been added to position k, and Slot-moved(k), to signal that the last slot of the packet has been moved to position k.

The control field is one byte wide, including the slot number (5 bits), the message type (1 bit), a spare bit for testing purpose, and a parity bit.

The mask is of variable length, and indicates the status of the slots in the payload, due to possible jitter.

The mask includes a 2-bit information for each circuit, to encode one of three possible cases: regular payload (4 bytes) corresponding to MASK=1, missing payload (0 byte) corresponding to MASK=0, or payload in excess (8 bytes) corresponding to MASK=2.

The total length of the mask is an integer number of bytes, and depends on the number N of circuits carried by the packet, as shown in the following mask table MASK-TABLE.

TABLE

| Number of circuits | MASK | | | | | | | |
|---|---|---|---|---|---|---|---|---|
| | 1 → 4 | 5 → 8 | 9 → 12 | 13 → 16 | 17 → 20 | 21 → 24 | 25 → 28 | 29 → 32 |
| Mask length bytes | 1 | 2 | 3 | 4 | 5 | 6 | 7 | 8 |

The payload is of variable length. It includes a regular payload of 4N bytes, and an extra payload of variable length. The regular payload carries 4 bytes per voice circuit per 125 microsecond, while the extra payload carries extra slots of some of the voice circuits, due to the jitter suffered by these circuits. These slots in excess are marked in the mask.

In the regular payload, the N slots are arranged in the sequential order of the slot number, as a concatenation of N 4-byte words. For example, if the circuit emulation packet carries 3 slots numbered from 1 to 3, then the regular payload includes 12 bytes arranged as the concatenation of 4 bytes for the first slot, 4 bytes for the second slot, and 4 bytes for the third slot. In the extra payload, the slot in excess are arranged in the sequential order as well. For example, if slots 2 and 3 are in excess in a circuit emulation packet, then the extra payload would include 8 bytes arranged as the concatenation of 4 bytes of slot 2 and 4 bytes of slot 3.

Within every period of the reference clock, that is within every 0.5 ms time frame, the server would ideally receive in the buffer memory one CE packet from each of the receive adapters, and build one CE packet to be transmitted to each output adapter.

Each incoming CE packet is scanned, and its payload is switched by the switching module to outgoing CE packets thanks to the connection tables maintained in the local store of the CE server (see FIG. 6) by the control module. The outgoing CE packets are then forwarded to the transmit adapters thru the switch interface.

Due to queuing at the transmit adapter at the previous switching node, and/or to a shift between the clocks of the different circuit emulation servers in the network, it may happen that within a 0.5 ms period, the server does not receive all of the incoming CE packets. The switching module then marks the missing slots in the masks of the outgoing CE packets.

It may also happen that within a 0.5 ms period, the server receives two CE packets from a particular input adapter. The switching module then appends the extra payload to each outgoing CE packets, and marks the extra slots in the mask.

The network can be designed in such a way that any CE packet would never carry more than two payloads for any voice circuit. For that purpose, it is sufficient to engineer the adapters in such a way that the total jitter occurred by a CE packet all along a route in the network, is always bounded by a maximum value which is smaller than the circuit emulation service period 0.5 ms.

FIG. 9 shows the path of a packet from its arrival at a receive adapter to its delivery to the transmit line. For the sake of this discussion, let assume that the switch is non-blocking and operates at 400 Mbps, and that each line is a T3 line clocked at 45 Mbps, which carries a single circuit emulation connection.

At the receive adapter, the CE packets are enqueued under the control of a scheduler 27 into the high priority queue which is CE-Q. Indeed, four possible traffic priorities are defined in the CE emulation system of the invention, circuit emulation (CE) corresponding to voice signals, real-time (RT) corresponding to video or voice signals, non-real time (NRT) used for interactive data and non-reserved (NR) used for file transfer.

Then, data bytes are switched to the CE server by means of switch 28. Switch 28 is a cell switch, that means that non-ATM incoming packets are chopped in small cells (53 bytes) before being switched, while native ATM traffic is switched as is. The high priority queue CE-Q is served as soon as it contains at least one cell, which means that the maximum waiting time corresponds to the service of one cell, i.e. 2 microseconds. Since switch 28 is non blocking, it introduces no jitter.

The circuit emulation server is engineered in such a way that enough processing power is provided to handle all the circuit emulation connections crossing the switching node. Therefore, no jitter is introduced on these connections. The only impairment may be a slight clock shift (say $10^{-6}$) that can easily be compensated at the output play-out buffer.

At the transmit adapter, the circuit emulation packets are received from the CE server and enqueued by the switch interface into the highest priority queue CE-Q for transmission to the line. The lower priority queues are served if and only if the higher priority queues are idle. That means that, at every request from the line for a new packet, scheduler 29 first looks at the CE-queue and serves a CE packet. If this queue is empty, then the scheduler looks at the RT-queue and, if it is empty, serves the NRT-queue. The NR-queue is served only when all CE-, RT-, and NRT-queues are empty.

If a circuit emulation packet arrives at the transmit adapter while a lower priority data packet is being served to the line, a preempt/resume mechanism such as the one disclosed in European patent application 94480047.3 "Method and apparatus for transmission of high priority traffic on low speed communication links" of the same applicant, is used to interrupt the transmission of this packet on a block basis in order to serve the circuit emulation packet, and then to resume the transmission of the data packet. With a pre-emption block of 128 bytes, the maximum jitter of a circuit emulation packet on a T3 line would be 22 microseconds resulting in a small waiting time. A smaller pre-emption block would be specified for proper operation on a T1 line.

The total jitter of a packet across the path shown on FIG. 9 would therefore be 24 microseconds. The route of the packet in the network usually includes a few hops. For example, a 5 hop route would generate a maximum jitter of 120 microseconds for a circuit emulation packet, which is smaller than the 0.5 ms period of the circuit emulation service. This example shows that the total jitter can be controlled so as to be smaller than the 0.5 ms period of the CE service. Actually, as show by relation (5), this control is performed automatically by the Path Selection program at connection set-up, based on the jitter characteristic which is stored in the Topology Data Base for every line in the network. Note that, as already mentioned, the maximum jitter that can be introduced by a transmit adapter on a circuit emulation packet is a characteristic of every line n in the network. As already seen, it is noted J(n) and it is reported in the Topology Data Base.

Figure 10:
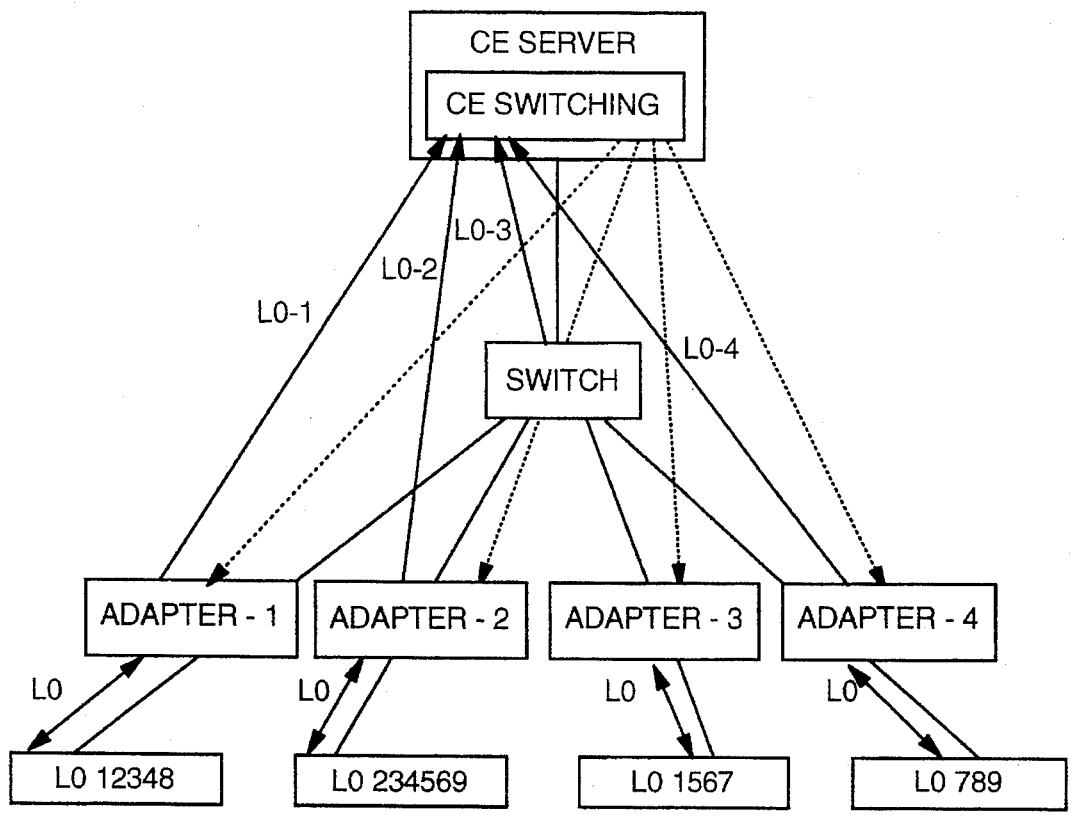
FIG. 10 is a schematic diagram illustrating an example of the data flow of the circuit emulation server.

FIG. 10 shows an example of the switching operation in the CE server which includes 4 adapters connected by means of a SWITCH. This example assumes that there is no missing or extra slot in the considered 0,5 ms period.

Within every 0,5 ms period, each of the 4 adapters, Adapter m (m=1 . . . ,4) receives a CE packet labelled L0, swaps the label to L0—m and forwards the packet to the CE server. Thus, within every 0,5 ms period, the CE server receives 4 CE packets in its buffer memory. Each incoming CE packet is enqueued in a receive queue and is processed at a time by the switching module which builds an outgoing CE packet with the same label L0—m. At the end of the 0,5 ms period given by the clock module, the 4 outgoing packets are sent back to the corresponding adapters for transmission over the line.

As illustrated on the bottom of FIG. 10, Adapter 1 includes 5 activated slots, Adapter 2 includes 6 activated slots, Adapter 3 includes 4 activated slots and Adapter 4 includes 3 activated slots. The number of activated slots of each adapter is also shown on FIG. 11 by the slot number table N-TAB of the CE-server.

Figure 11:
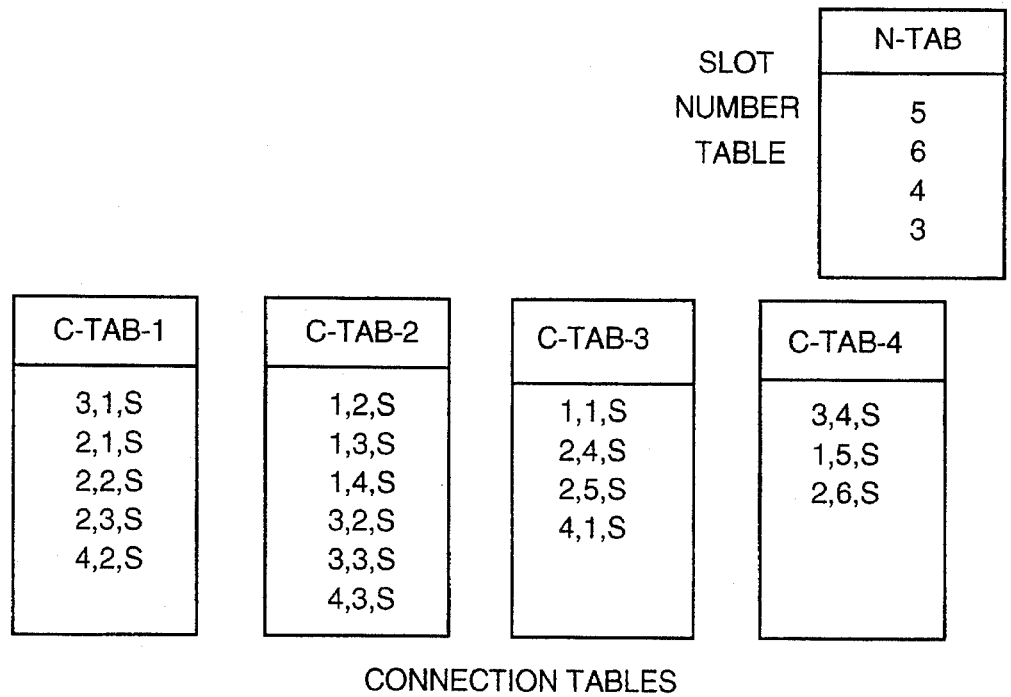
FIG. 11 represents the contents of the slot number table and the connection tables used in the circuit emulation server for the example illustrated on FIG. 10, FIGS. 12a and 12b represent the flow-diagrams of circuit emulation packet processing in the circuit emulation server.

Also illustrated on FIG. 11 are the connection tables of the CE server. Each connection table includes as many entries as the number of activated slots in the associated adapter. Each entry comprises the number of the adapter to be used for transmitting the slot associated to the entry, the slot number to be used therefor and a status bit. Thus, the first slot of Adapter 1 corresponds to the first entry of table C-TAB-1 having the contents: 3, 1, S. This means that the first slot is to be transmitted as first slot of Adapter 3. Likewise, the second slot of Adapter 3 corresponds to the second entry of table C-TAB-3 with a contents of 2, 4, S, meaning that this slot is to be transmitted as fourth slot of Adapter 2.

Figure 12A:
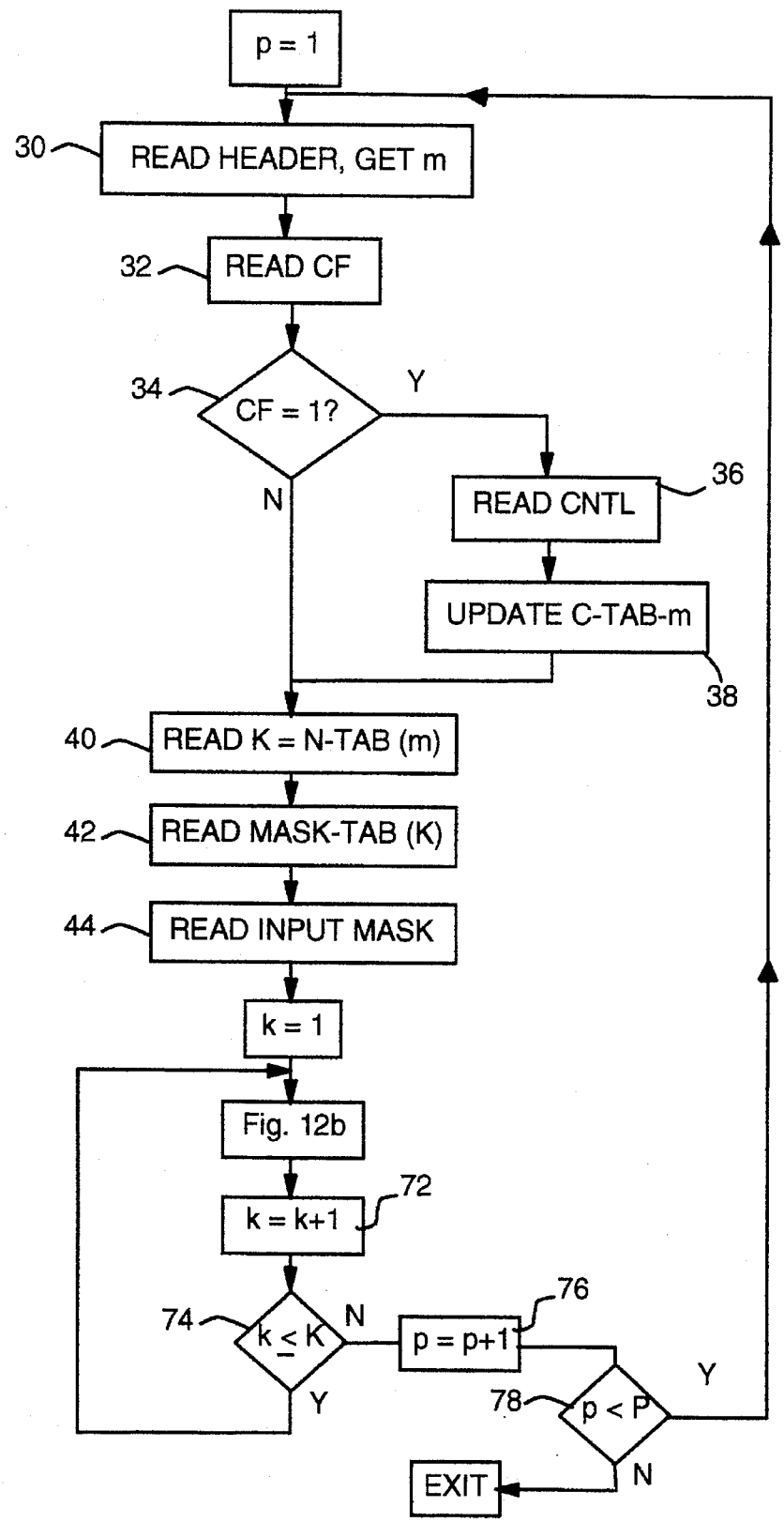
Figure 12B:
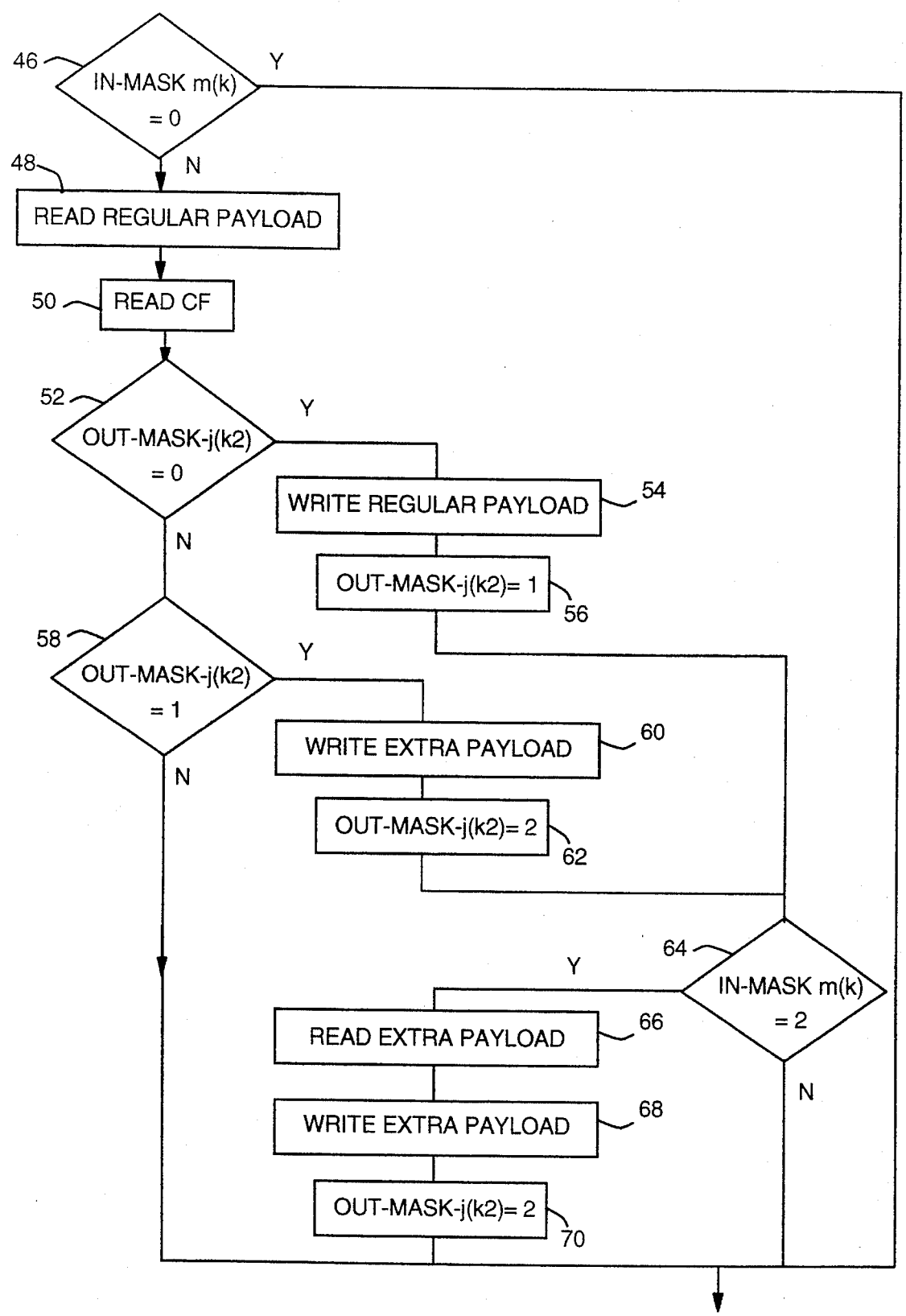

FIGS. 12a, and 12b show a flow diagram of the packet processing which is implemented in the switching module.

The process loops over the P CE packets received within the last 0.5 ms period, and which are enqueued in the receive queue. In the ideal case where no clock shift nor queuing would occur in the network, P would be equal to M, but since each of the M receive adapters may have sent either 0, or 1, or 2 packets, P is in the range (0,2M).

For each incoming CE packet, the first task is to read (30) the header and to extract the receive adapter index m from the label L0—m. Then, the control flag is extracted (32) from the header, and if it is set (34), the control field is read (36) and the connection table C-TAB-m is updated (38) according to this control field, as detailed later.

Then, the process reads (40) the slot number table N-TAB(m) to get the number K of activated slots in the packet, then reads (42) the mask table MASK-TAB(K) to get the length of the mask, reads (44) the mask, and finally loops over the slots k=1, . . . ,K.

In FIG. 12a and 12b, the operation to read slots from incoming packets and to store them into outgoing packets are using pointers as highlighted in FIGS. 13, 14 and 15 which represent the format of the circuit emulation packets as they appear before and after the switching process described in FIG. 12a and 12b has taken place.

As said, the input to the processing is a set of P CE packets as shown on FIG. 13. These packets are enqueued and have the general format given earlier in FIG. 8, featuring a header, an optional control field, a mask, a regular payload of length 4K, where K denotes the number of slots in the incoming CE packet, and an extra payload of variable length less or equal to 4K. In the course of the processing, two pointers are initialised and updated for each input packet, IN-PTR-p and IN-EXTPTR-p, which respectively point on the regular and extra payloads of CE packet p.

Before the switching process begins, the M output CE packets are empty blocks reserved and formatted as shown on FIG. 14. They include a header, a mask, a regular payload of length 4N, and an extra payload of length 4N, where N denotes the number of slots in the outgoing CE packet. For each output packet i (i=1, . . . ,M), two pointers are initialized and updated for each output packet, OUT-PTR-i and OUT-EXTPTR-i which respectively point on the regular and extra payloads of CE packet i.

Referring again to FIG. 12b, for each slot k, IN-MASK-m(k) represents the value 0,1 or 2 of the mask for slot k in the input CE packet received from adapter m and OUT-MASK-j(k2) represents the decimal value 0,1 or 2 of the mask for slot k2 in the output CE packet to be transmitted to adapter j.

If IN-MASK-m(k) is not equal to 0 (block 46) for slot k, the connection table C-TAB-m(k) gives (48) the output adapter index j and the output slot index k2. The regular payload is read (50) the contents of the memory at the address pointed to by IN-PTR-p+4(k−1) being stored in register R. It must be noted that this address corresponds to the regular payload of slot k in the input packet p (p=1, . . . . P).

$$R=X(IN\text{-}PTR\text{-}p+4(k-1))$$

If OUT-MASK-j(k2) is equal to 0 (52), the regular payload is written (54) in the output CE packet. The contents of register R is stored in the memory location corresponding to the address pointed to by OUT-PTR-j+4(k2−1), that is the address of the regular payload of slot k2 in the output packet j.

$$X(OUT\text{-}PTR\text{-}j+4(k2-1))=R$$

OUT-MASK-j (k2) is changed into 1 (56). Otherwise, when OUT-MASK-j (k2) is equal to 1 (58), the extra payload of the CE packet is written (60), the contents of register R being stored in the memory location corresponding to the address pointed to by OUT-EXTPTR-j+4(k2−1), that is the address of the extra payload of slot k2 in the output packet j.

$$X(OUT\text{-}EXTPTR\text{-}j+4(k2-1))=R$$

OUT-MASK-j(k2) is then changed into 2 (62). In case OUT-MASK-j-(k2) is neither 0 or 1, the process returns to the loop of FIG. 12a wherein k is incremented. After regular payload or extra payload of the output CE packet has been written, a test determines (64) whether IN-MASK-m(k) is equal to 2. If so, the extra payload is read (66) in the incoming CE packet. The contents of the memory at the address pointed to by IN-EXTPTR-p are being stored in register R. It must be noted that the address corresponds to the extra payload of slot k in the input packet p.

$$R=X(IN\text{-}EXTPTR\text{-}p)$$

Then, the value of the extra payload is incremented by 4.

$$IN\text{-}EXTPTR=IN\text{-}EXTPTR+4$$

Then, the extra payload of the output CE packet is written (68) by storing the contents of register R into the memory location corresponding to the address pointed to by OUT-EXTPTR-j+4(k2−1), that is the address of the extra payload of slot k2 in the output packet j.

*X(OUT-EXTPTR-j+4(k2−1))=R*

Finally, OUT-MASK-j(k2) is changed into 2 (70) and the process returns to the loop of FIG. 12a wherein k is incremented.

After that k is incremented (72) a test determines whether k<K (74). If so, the process returns to FIG. 12b. If not, p is incremented (76) and a test determines (78) whether p has reached the value P in order to exit or to loop again through the process.

After the switching process has been completed for all the incoming CE packets, a post-processing phase takes place to include an eventual control field to carry an in-band message to the next CE server on the route of the packet, and to compress the extra payload before transmission to the transmit adapters. The format of the CE packets at the end of this post-processing phase is shown on FIG. 15.

Figure 16:
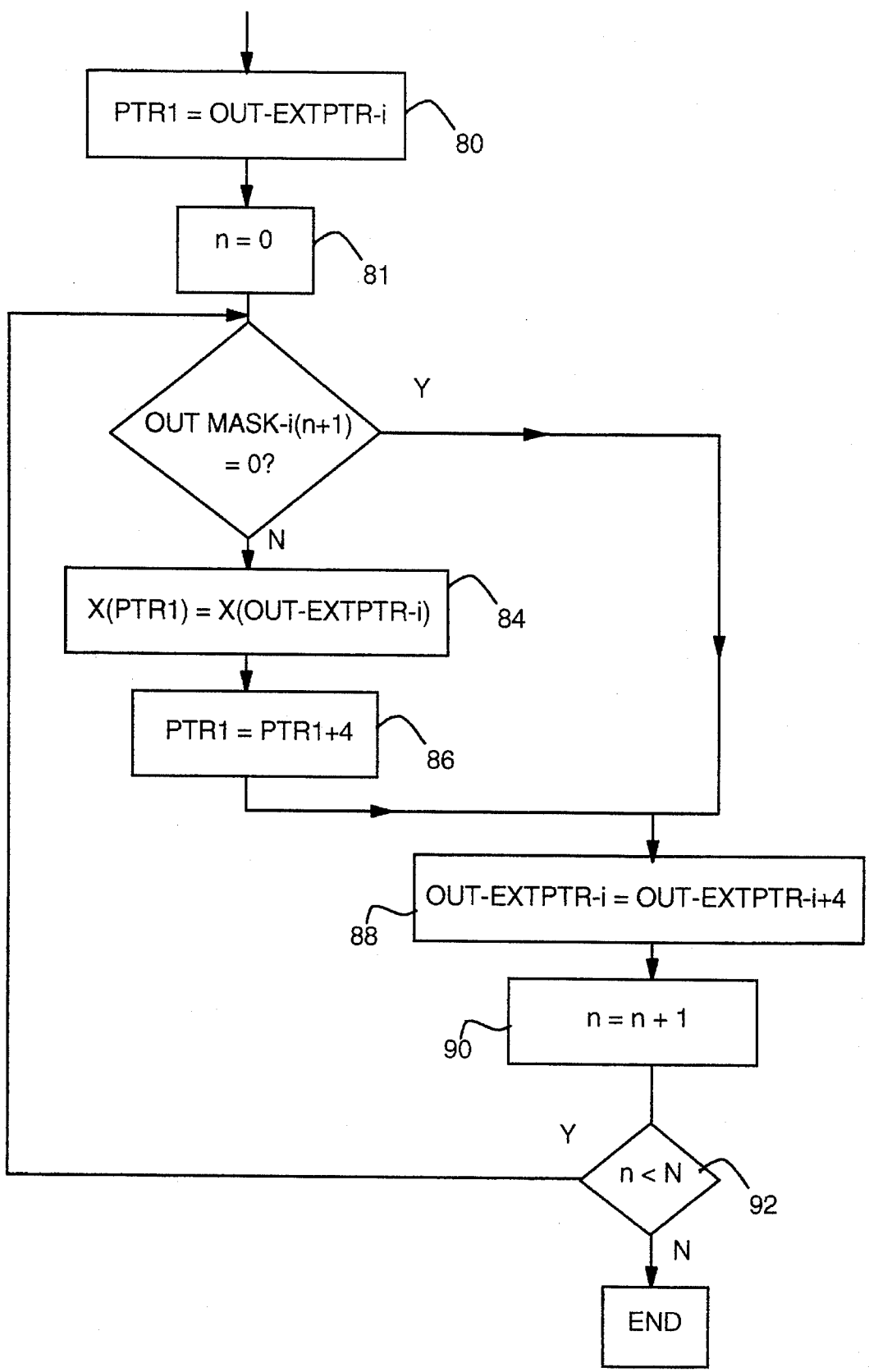
FIG. 16 represents the flow-diagram of the extra payload compression algorithm.

The algorithm of compression of the extra payload before transmission to the transmit adapters is illustrated on FIG. 16. First, a pointer PTR1 is written with the contents of pointer OUT-EXTPTR-i (80). A counter is initialized at zero (81). A test determines whether OUT-MASK-i(n+1) is equal to 0 (82). If not, the contents of the memory at the address pointed to by pointer PTR1 is written with the contents of the memory location pointed to by pointer OUT-EXTPTR-i (84), and pointer PTR1 is incremented by 4 (86). Then, and directly when OUT-MASK-i(n+1) is equal to 0, pointer OUT-EXTPTR-i is incremented by 4 (88) before incrementing counter n by 1 (90). Finally, a test determines (92) whether the contents of counter n has reached N. If not, the process returns to the test determining the value of OUT-MASK-i(n+1).

The above description deals with a connection established from a source exchange telephone device to a destination exchange telephone device. When such a connection is being established, a connection from the destination exchange telephone device to the source exchange telephone device needs to be also established. The determination of the best route and the setting up phase are using the same steps as described above. They result in a connection which can use a route different from the route which has been set up from the source exchange telephone device to the destination exchange telephone device. However, it should be clear that the same route could be used for the two ways of transmission. In this case, both ways are actually set up using a single connection set-up message. Upon reception of a copy of this message, each control point of the single route sends two set-up slot messages to its circuit emulation server which then processes each message according to the method described above.

END OF CONNECTION

When the circuit emulation server receives the connection-take-down message, it first identifies the connection by use of the correlator.

*(i,k1)=COR-TAB(C_cor)*

Then it marks the corresponding slot as reserved in the connection table,

*C-TAB-i(k1)=j,k2,1* posts a move-slot task, and cleans the connection correlator entry in the COR-TAB table.

When a connection has been taken down, the circuit emulation packet carries an idle slot that needs to be compressed in order no to waste bandwidth on the line. This is the purpose of the move-slot task that is executed by the CE server control module, in conjunction with the previous and next servers on the route, thanks to mechanisms that are similar to the connection set-up mechanisms.

Let's assume that a CE server has just taken down a voice connection using slot number k1 on input line i. As said, the server has posted a move-slot(i,k1) task during the take down process, and executes this task at its earliest convenience. It first sends a control in-band message to the previous CE server on the route:

*Move-slot(i,k1)*

When the previous server P-CES receives this message, it first identifies the input adapter index i0 and slot number k0 that correspond to the last slot of the CE packet carried on its output line i. This identification can be carried out either by screening all the connection tables, or by table look-up if additional tables have been defined in the local store of the server.

Once i0 and k0 have been determined, the P-CES server updates the connection table in order to move the last slot of the CE packet transmitted to line i to slot position k1:

*C-TAB-i0(k0)=i,k1,2*

It then starts to switch the slots to position k1 in the CE packets outgoing on line i, and inserts in-band slot-moved(k1) messages in these packets.

Upon reception of these in-band messages, the server CES updates its connection table

*C-TAB-i(k1)=C-TAB-i(N-TAB(i))*

It then releases the entry for the last slot:

*C-TAB-i(N-TAB(i))=X,X,0* and updates the slot number table

*N-TAB(i)=N-TAB(i)−1* and acknowledges to P-CES which then stops inserting in-band slot-moved(k1) messages in the CE packets.

We claim:
1. A voice circuit emulation system in a packet switching network comprising a plurality of switching nodes interconnected by connection lines and including intermediary switching nodes connected to other switching nodes and end switching nodes each connected to at least an exchange telephone device, each switching node being associated to a control point in charge of controlling the exchange of voice signals carried by switching packets in the network between two exchange telephone devices; said voice circuit emulation system comprising:

computing means contained in each of the control point for determining the best route between any source exchange telephone device and any destination exchange telephone device by identifying which of said connection lines are eligible based upon the requirement of a quality of service specified in terms of a maximum delay and a packet loss probability;

setting up means in a control point associated to a first switching node of the determined best route for transmitting a set-up message to the control points associated to all the switching nodes along said determined best route so as to reserve an amount of bandwidth on each connection line of said determined best route outgoing from each of said switching nodes along said determined best route;

a circuit emulation server coupled to selected switching nodes, said circuit emulation server including a connection table containing, for each incoming connection line, the identification of each outgoing connection line associated to each slot of a circuit emulation packet received from said incoming connection line and the identification of each slot of the circuit emulation packet to be transmitted on said outgoing connection line, and a switching module for looking up said connection table and for each slot contained in each incoming circuit emulation packet received from all incoming lines and switching the contents of said slot to the slot of the outgoing connection line identified in said connection table.

2. The voice circuit emulation system according to claim 1, wherein said circuit emulation server associated to a switching node further includes a slot number table N-TAB having a number of entries corresponding to the number of incoming connection lines, each entry indicating the number of slots currently activated for the associated incoming line.

3. The voice circuit emulation system according to claim 1 or 2, wherein said circuit emulation server associated to a switching node further includes a correlation table COR-TAB having a number of entries corresponding to the number of connections going through said switching node with each entry giving, for the corresponding connection, the identification of the incoming line, and the identification of the slot of the packet received from said incoming line for said connection.

4. A process for establishing a circuit switching connection for routing circuit emulation packets in a packet switching network comprising a plurality of switching nodes interconnected by connection lines and including intermediary switching nodes connected to other switching nodes and end switching nodes each connected to at least an exchange telephone device, each switching node being associated to a control point in charge of controlling the exchange of voice signals carried by circuit emulation (CE) packets in the network between two exchange telephone devices, said process comprising the steps of:

providing for each switching node of a circuit switching connection a circuit emulation server for reserving a slot (k1) on an input connection line (i) and sending an activate slot message to a preceding circuit emulation server of said input connection line containing the identification of said input connection line and the identification of said reserve slot;

determining the best route to transmit voice signals between any source exchange telephone device and any destination exchange telephone device;

configuring each switching node of said best route for receiving and transmitting CE packets containing at least one slot of voice signals; and sending, from each control point associated with said each switching node of said best route to each circuit emulation server associated with said each switching node, a set-up slot message identifying the input connection line (1), an output connection line (j), the circuit emulation server associated to the next switching node (N.CES) of the connection and the circuit emulation server associated to the preceding switching node (P.EES).

5. The process according to claim 4 wherein the control point associated to the end switching node at the origin of the circuit switching connection to be established between said source exchange telephone device and said destination exchange telephone device sends a connection set-up message to all the control points associated to the switching nodes along said best route, said message containing a list of the addresses of the control points on said best route, the list of the connection lines interconnecting these control points, the request bandwidth C_eq, and a connection correlator which is set by said origin control point and which is used by all the other control points to uniquely identify the connection.

6. The process according to claim 4 or 5, wherein, upon reception of said connection set-up message, each control point along said best route sends two set-up-slot messages to its associated circuit emulation server, each said set-up-slot message identifying the input connection line (i), the output connection line (j), the circuit emulation server associated to the preceding switching node (P-CES) and the circuit emulation server (N-CES) for respectively said connection between said source exchange telephone device and said destination exchange telephone device and the reciprocal connection between said destination exchange telephone device and said source exchange telephone device along the same route.

7. The process according to claim 4, wherein said circuit emulation server associated to each switching node contains a Correlation table (COR-TAB) giving for each said established connection through said switching node, the identification of said input connection (i) and the identification of said reserved slot (k1), said correlation table being updated with a new entry (i, k1) corresponding to said established connection when said circuit emulation server has received said set-up slot message from the associated control point and has reserved a slot.

8. The process according to claim 7 wherein said correlation table is looked up by said circuit emulation server to get the identifications of said input connection line (i) and of said reserved slot (k1) after it has received an activate slot message from said next circuit emulation server (N-CES), said identifications being used to update the entry of the connection table corresponding to said input connection line with the identification of the slot (k2) to be used on said output connection line (j) for said established connection.

9. The process according to claim 8, wherein said activate-slot message is sent by the control point associated to said circuit emulation server receiving said message when said control point belongs to the end switching node connected to said destination exchange telephone device.

10. The process according to claim 8, wherein said associated circuit emulation server activates said entry C-TAB-i(k1) of said connection table corresponding to said input connection line (i) by setting a status flag, after it has received an in-band slot-activated message from said preceding circuit emulation server.

11. The process according to claim 10, wherein said associated circuit emulation server sends a slot-activated-ack message to said preceding circuit emulation server (P-CES) to acknowledge the reception of said in-band slot-activated message.

12. The process according to claim 10, wherein said associated circuit emulation server sends an in-band slot-activated message to said next circuit emulation server (N-CES).

13. The process according to claim 10, wherein said in-band slot-activated message is sent by the control point to said associated circuit emulation server when said control point belongs to the end switching node connected to said source exchange telephone device.

14. The process according to claim 4, wherein each circuit emulation packet which is transmitted from a first switching node to a second switching node includes a regular payload composed of the concatenation of N words of x bytes each wherein N is the number of slots which are activated on the connection line interconnecting said first and second switching nodes and x is the number of bytes sent in each circuit emulation packet by an exchange telephone device.

15. The process according to claim 14, wherein said circuit emulation packet further includes an extra payload of variable length, containing extra words for some of the voice circuits exchanging voice signals corresponding to the words contained in said regular payload, and a mask field indicating which of said words contained in said regular payload have extra words in said extra payload, such extra words being due to jitter suffered by said voice circuits.

16. The process according to claim 15, wherein said mask further indicates which of said voice circuits have no words in said regular payload of said circuit emulation packet, such missing words being due to jitter suffered by said voice circuits.

17. The process according to claim 4, wherein said voice signals are PCM signals sampled at 8 kHz with each sample being represented by a byte during 125 µs, and x is equal to 4 whereby the duration of said word of 4 bytes is 0,5 ms.

18. The process according to claim 4, wherein the information received at each switching node is classified in accordance with several priority levels determining the priority order used to transmit it to a next switching node with the higher priority level corresponding to the circuit emulation packets.

19. The process according to claim 4, further including another process for taking down the circuit switching connection by carrying out the following steps:

a connection-take-down message indicating the connection to be taken down is sent to each circuit emulation server, each given circuit emulation server send an in-band move-slot message to the preceding circuit emulation server identifying the slot to be removed on the connection line interconnecting said preceding circuit emulation line and said given circuit emulation line, and said preceding circuit emulation server identifies the last slot of the circuit emulation packet transmitted on said connection line, and updates its connection table associated to the input line carrying said last slot in order to move said last slot to said slot to be removed.

20. The process according to claim 19, wherein said preceding circuit emulation server sends a message to said given circuit emulation server to inform it that said last slot has been moved to said slot to be removed, whereby said given circuit emulation server updates its connection table associated to said connection line for the slot which has been removed and releases the entry of said connection table for said last slot.

21. A circuit emulation CE server for using in a packet switching communications network having switching nodes interconnected by connection lines; said CE server comprising:

a buffer memory for storing IN CE packets and OUT CE packets;

a local store for storing routing tables containing, for each incoming connection line, the identification of each outgoing connection line, the identification of each outgoing connection line associated to each slot of the circuit emulation packet received from said incoming connection line and the identification of each slot of the CE packet to be transmitted on said outgoing transmission line; and a switch module for monitoring the routing tables and switching slots, containing voice signals, contained in the IN CE packets received from an incoming connection line to slots contained in the OUT CE packets for subsequent transmission on different outgoing connection lines.

22. The CE Server of claim 21 further including a control module for controlling the switch module and the routing tables.

* * * * *